United States Patent [19]

Long

[11] Patent Number: 4,915,829
[45] Date of Patent: Apr. 10, 1990

[54] ACTIVATED-SLUDGE AERATION SYSTEM

[76] Inventor: Sam Long, 3046 N. 40th St., Kansas City, Kans. 66104

[21] Appl. No.: 240,546

[22] Filed: Sep. 6, 1988

[51] Int. Cl.⁴ .............................................. C02F 3/02
[52] U.S. Cl. .................................... 210/151; 210/201; 210/221.2; 210/525; 210/620
[58] Field of Search ............... 210/150, 151, 256, 220, 210/219, 630, 527, 221.2, 523, 525, 529, 920, 259, 620, 200, 201, 202

[56] References Cited

U.S. PATENT DOCUMENTS

| | | | |
|---|---|---|---|
| 3,312,346 | 4/1967 | Walker | 210/202 |
| 3,353,677 | 11/1967 | Thayer et al. | 210/256 |
| 3,402,125 | 9/1968 | Tanaka | 210/151 |
| 3,505,212 | 4/1970 | Huber | 210/256 |
| 3,595,783 | 7/1971 | Pflanz et al. | 210/256 |
| 3,599,794 | 8/1971 | Schreiber | 210/256 |
| 3,617,540 | 11/1971 | Bishop et al. | 210/630 |
| 3,649,529 | 3/1972 | Walker | 210/256 |
| 3,817,858 | 6/1974 | Yost | 210/201 |
| 3,926,808 | 12/1975 | Goddard | 210/202 |
| 3,984,321 | 10/1976 | Kaelin | 210/202 |
| 3,993,568 | 11/1976 | Fux | 210/527 |
| 4,087,361 | 5/1978 | Block et al. | 210/201 |
| 4,093,539 | 6/1978 | Guarino | 210/151 |
| 4,290,884 | 9/1981 | Mandt | 210/202 |
| 4,443,338 | 4/1984 | Reid | 210/220 |
| 4,446,018 | 5/1984 | Cerwick | 210/256 |

Primary Examiner—Richard V. Fisher
Assistant Examiner—Cynthia L. Nessler
Attorney, Agent, or Firm—D. A. N. Chase; Joan Optican Herman

[57] ABSTRACT

An activated-sludge sewage treatment plant includes an aeration chamber having at least two aeration sections and an intermediate sludge scalper device. The sludge scalper device is positioned to receive the effluent of a primary aeration section the effluent of the sludge scalper being received by a hydraulic plug flow section. The primary aeration section may be a complete-mix basin, a hydraulic plug-flow basic or a combination of both. The secondary aeration section must include at least one hydraulic plug-flow basin. A final clarifier receives and treats the effluent from the secondary aeration section. By removing the more settleable fraction of the activated sludge from the sewage being treated, prior to the final stage of plug flow aeration, the sludge scalper avoids settling of this sludge in the final aeration chamber.

8 Claims, 2 Drawing Sheets

ACTIVATED-SLUDGE AERATION SYSTEM

BACKGROUND OF THE INVENTION

This invention relates to improvements in activated-sludge sewage treatment systems. This invention more specifically relates to activated-sludge sewage treatment systems in which all or part of the aeration basin is a long, narrow chamber designed to promote plug flow of the mixed raw sewage and recycle sludge from the inlet end of the chamber to the outlet end. Such plug flow permits the introduction of more air per unit volume near the inlet end in order to give a large reduction of biological oxygen demand (B.O.D.) per unit volume of aeration chamber, and less air per unit volume near the outlet end in order to save the cost of pumping air which would not be utilized because there is not enough food left in the mixed liquor to consume a large amount of available oxygen. This invention is particularly applicable to activated-sludge sewage treatment systems designed to produce an effluent with a B.O.D. content substantially less than ten parts per million (10 ppm).

Sewage treatment processes remove undesirable or offensive waste from water. Primary sewage treatment removes solids from the water by using screens, grit chambers, skimming tanks, and settling basins. Secondary sewage treatment generally is preceded by primary treatment. It is a process whereby a biological treatment system rapidly breaks down organic material. If the effluent of the secondary sewage treatment is not sufficiently clean to meet the mandated standard, secondary treatment may be followed by tertiary treatment.

The activated-sludge sewage treatment system is a commonly used form of secondary treatment. It uses biologically active growths as a means to process raw sewage into relatively clean water. This microbiological culture is mixed with raw sewage (or the effluent of a primary clarifier) in a basin or chamber. Aeration means provide sufficient air to promote consumption of the colloidal and soluble organic matter (i.e., biologically degradable waste) in the sewage by the culture. When the microbes feed upon the organic matter in the sewage, they generate an additional mass of microorganisms (referred to as "activated sludge"), along with carbon dioxide, water, nitrogen compounds, and traces of other compounds. When substantially all of the colloidal and soluble matter has been converted to insoluble microbes and innocuous by-products, the mixture is directed to a clarifier or secondary settling tank, which separates the relatively clean water, or finally treated effluent, from the microbes, and allows the clean water to be decanted. The finally treated effluent is then released into a river or an intermittent stream. A substantial portion of the activated sludge is recycled to the aeration basin, while some of the sludge is continuously withdrawn to avoid excessive accumulation of the recycle sludge.

For this system to produce a good quality of treated effluent, the decantation step must remove more than 99% of the solids from the feed mixture. Occasionally, the microbiological growth produces a filamentous mycelium which settles very slowly, if at all. Filamentous mycelia in the effluent of the aeration chamber make it impossible to get a good quality of treated sewage from the decanter (clarifier). This filamentous growth is caused by various factors, but most often by too much or too little air. Penury dictates that if there is an imbalance of oxygen demand and oxygen supply, the error will almost always be a short oxygen supply. Once a filamentous growth starts, it is difficult to suppress. In a large aeration basin with an adequate air supply, it is possible to have localized areas of oxygen starvation which invite filamentous growth. The designing engineer must avoid this pitfall.

Traditionally the aeration basin has been a narrow, long chamber designed to promote plug hydraulic flow. Typical dimensions are from 20 feet by 200 feet to 40 feet by 1,000 feet, with water depths of 12 feet to 18 feet. For economy of land use and of construction costs, the longer chambers are usually built in three parallel sections with a common wall between sections. The plug hydraulic flow of the mixed liquor through the aeration basin insures the maximum reduction of pollutants in the clarified effluent, while maintaining a high rate of oxygen usage throughout most of the chamber volume. In fact, one of the problems with the plug-flow aeration basin is the tendency to grow filamentous mycelia in spots of localized oxygen starvation.

In the past thirty years, the complete-mix aeration basin has been developed to compete with the plug-flow aeration basin. In the complete-mix aeration basin, all mycelial growth occurs in a medium with substantially the same concentration of B.O.D. as that of the clarified effluent. It is thus easy to avoid spots of localized oxygen starvation and the attendant filamentous mycelial growth.

While longitudinal recirculation is discouraged in a plug-flow aeration basin, transverse mixing is promoted, to transfer oxygen from the point of introduction to the body of the mixed liquor, and to prevent settling of the activated sludge. The soluble and colloidal pollutants are quite evenly distributed throughout the transverse section, and it is necessary to bring oxygen and microbes to all parts of the chamber in order to consume the pollutants. Currently in the United States, this is done by "spiral-roll aeration" as shown in FIG. 1. In this system, a series of air spargers or diffusers is located near the bottom of one long wall of the chamber. The rising air bubbles carry a stream of water up this wall. Gravity carries this water across the top of the pool, down the opposite wall, and across the floor of the basin back to the air spargers. The turbulence of this process holds the activated sludge in suspension. Ideally, a droplet of water follows a spiral course from the inlet of the aeration chamber to the outlet, sweeping the activated sludge with it and repeatedly absorbing oxygen as it passes the air spargers.

Past practice in the United States has been to supply air to an activated-sludge aeration basin at a fairly constant rate over the 24-hour period, even though the hourly rate of inflow of raw sewage tends to vary widely during this time, as shown in FIG. 2. Since the sewage usually has a higher concentration of B.O.D. at the time of the higher flow rate, the ratio of the highest hourly input of B.O.D. to the lowest hourly input of B.O.D. during the diurnal cycle may be six to one, or even eight to one, although the ratio of the highest hourly flow rate to the lowest hourly flow rate is perhaps only four to one.

Although, with the constant rate of air flow to the aeration basin, the activated sludge adsorbs some of the excess oxygen during periods of low B.O.D. inflow and releases it during periods of high B.O.D. inflow; this system of control of air flow results in pumping more air than is needed to promote the biological growth, and /or gives a treated-sewage effluent with a B.O.D. content which varies widely over the diurnal cycle. Hopefully, the daily average B.O.D. content will meet the 20 ppm standard of the United States Environmental Protection Agency. In recent years, some United States and foreign municipalities have begun using computer control to adjust the rate of air flow in response to the immediate rate of B.O.D. input to the aeration basin, in order to reduce the cost of pumping air and/or to produce a treated-sewage effluent of consistently good quality. Unfortunately, when the air flow is reduced to match the low B.O.D. input in the early hours of the morning, there is insufficient transverse movement of the mixed liquor to hold the activated sludge in suspension, and sludge may accumulate on the floor of the basin across from the air diffusers, as shown in FIG. 1. This effect is most pronounced near the exit end of a plug-flow aeration basin designed to produce an effluent with less than 10 ppm of B.O.D., where the air flow required for oxygen supply during the hours of maximum rate of B.O.D. input is barely sufficient to maintain the activated sludge in suspension. The settled sludge contributes nothing to the pollution-abatement process, and by depleting the local oxygen supply, may initiate the growth of filamentous mycelia.

Near the inlet end of a plug-flow aeration basin, where there is much food for biological growth, some of the mycelia tend to grow in clumps. These clumps are difficult to keep suspended in the mixed liquor, and present a reduced amount of surface for absorbing oxygen and nutrients.

OBJECTS OF THE INVENTION

It is, therefore, the primary object of the present invention to provide a sludge scalper for removing the more settleable fraction of the activated sludge from the mixed liquor of an activated-sludge aeration chamber prior to the final stage of plug-flow aeration.

It is another object of the present invention to design an aeration system to economically produce a clarified effluent of substantially less than 10 ppm of B.O.D. from raw sewage containing some 200 ppm of B.O.D.

DESCRIPTION OF THE PREFERRED EMBODIMENT

Figure 2:
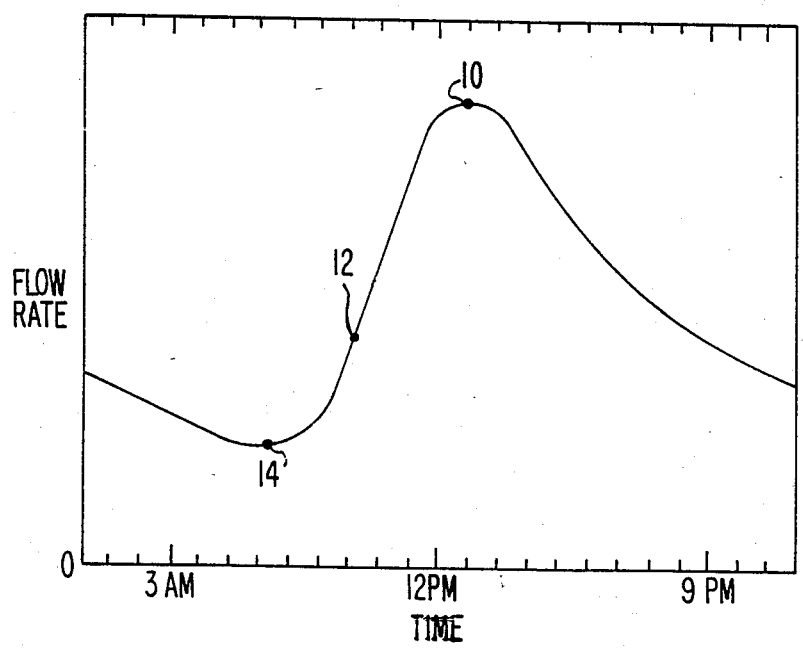
FIG. 2 is a graph showing the typical daily cycle of rate of inflow to a municipal sewage treatment plant.

Referring initially to FIG. 2, the graph indicates the widely varying inflow rate to a typical municipal sewage treatment plant during a twenty-four hour period. It is seen from FIG. 2 that the maximum hourly flow rate 10 is twice the average hourly flow rate 12. Furthermore, the minimum hourly flow rate 14 is one-half the average hourly flow rate 12.

Figure 1:
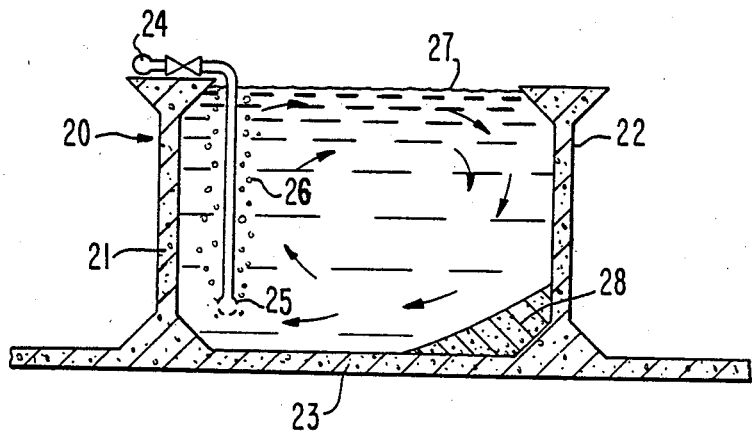
FIG. 1 is a diagrammatic, lateral cross-section of a plug-flow aeration chamber of the prior art.

Referring to FIG. 1, a typical plug-flow aeration chamber of the prior art, generally referred to as 20, is depicted. The chamber is defined by elongated walls 21 and 22, and by a floor 23. Air supply 24 provides air to the chamber 20 through diffusers 25 located near the floor 23 adjacent wall 21. As air is released from the diffusers 25, the air bubbles 26 formed rise and carry a stream of water up wall 21. Gravity works to carry this water across the top of the mixed liquor 27, down the wall 22, and across floor 23 of the chamber 20 back to the diffusers 25. This turbulence, known as spiral-roll aeration, holds the activated sludge in suspension, allowing the sludge to continually mix with and absorb the oxygen and the organic pollutants. The path of the liquid in spiral-roll aeration is depicted by the arrows in FIG. 1.

However, when air flow from the diffusers 25 is reduced in response to the lower B.O.D. levels during certain times of the day, the transverse movement of the mixed liquor is insufficient to hold the activated sludge in suspension. A portion of the sludge 28 therefore tends to accumulate on the floor 23 of the chamber 20 adjacent wall 22, creating undesirable inefficiency in the aeration process.

Figure 3:
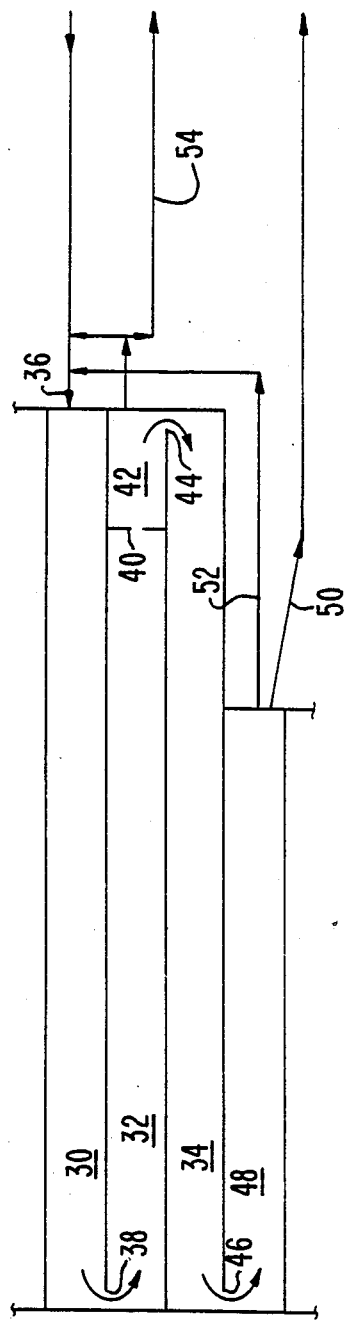
FIG. 3 is a diagrammatic, plan view of a plug-flow aeration chamber having a sludge scalper.

Referring now to FIG. 3, a series of hydraulic plug-flow aeration chambers, generally referred to as 30, 32 and 34, respectively, is depicted. Raw sewage (or the effluent of a primary clarifier) enters chamber 30 at inlet 6. It then flows through chamber 30 and is processed by conventional hydraulic plug-flow aeration means (not shown). The sewage flows through conduit means 38 into chamber 32, where further processing by plug-flow aeration occurs.

Flowing through passage 40, the sewage then enters sludge scalper 42, which is a small settling basin similar to a conventional settling basin used for final clarification. The sewage entering sludge scalper 42 preferably should have a B.O.D. of approximately 10 ppm to 40 ppm. The dissolved oxygen content in the sewage at this stage should preferably range from 0.2 ppm to 2.5 ppm. The final clarifier of a typical activated-sludge sewage treatment system is a large chamber designed to avoid turbulence of the chamber contents. The sludge in the incoming effluent of the aeration chamber settles to the floor of the clarifier, and is either removed by a traveling siphon device which periodically sweeps all areas of the floor, or is pushed by a submerged mechanical scraper to a sump, from which it exits through a conduit. The clarified water flows over a weir into the outfall of the treatment plant. This final clarifier must remove more than 99% of the solids from the aerated sewage to produce an acceptable effluent. On the other hand, the sludge scalper 42 has a much smaller stilling chamber and is intended to remove 10% to 70% (but preferably 20% to 30%) of the sludge solids from the stream of sewage under treatment. The sludge scalper 42 of the present invention is preferably a submerged mechanical scraper which pushes the settled sludge solids to a sump, and the sludge exits the sludge scalper 42 through a conduit. In an alternative embodiment, the sludge scalper 42 is a traveling siphon device which periodically sweeps the settled sludge from all areas of the floor. The effluent from the sludge scalper 42 may exit through a port in the wall of the chamber (not shown), and a skimming mechanism is employed adjacent the surface of the chamber contents for skimming off fatty residues.

The effluent of the scalper 42, with 30% to 90% of the less settleable sludge solids, exits through passageway 44 into plug flow aeration chamber 34, where it is further aerated and then discharged by means 46 into the final clarifier 48. The clarified effluent is discharged by means 50. A portion of the sludge removed by the sludge scalper 42 is disposed of via sludge disposal means 54 and the rest is introduced into the inlet means 36 as recycle sludge. All of the sludge from the final clarifier 48 is returned by means 52 to inlet 36 as recycle sludge.

Figure 4:
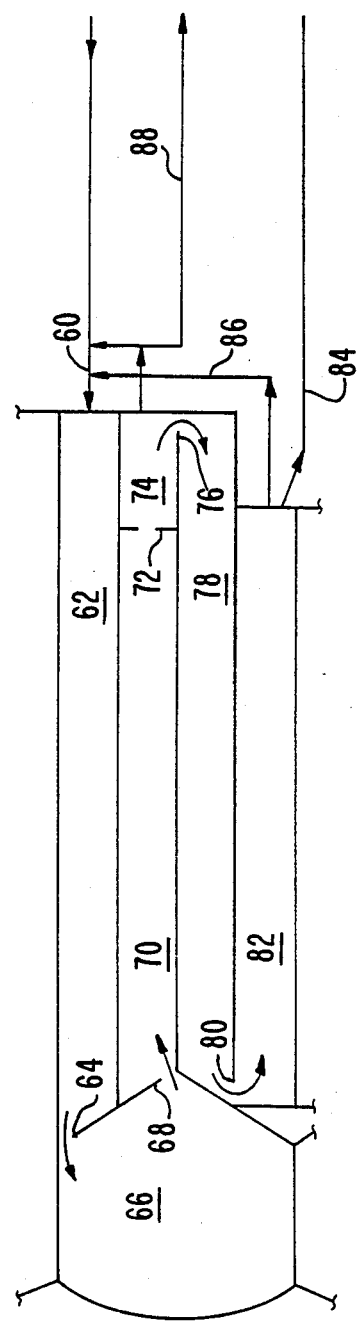
FIG. 4 is a diagrammatic, plan view of a hybrid aeration chamber comprising a complete-mix section, a hydraulic plug-flow section, a sludge scalper and a clarifier.

An alternative embodiment is illustrated in FIG. 4, where a hybrid aeration chamber is shown. Raw sewage (or the effluent of a primary clarifier) and recycle sludge are first introduced by inlet means 60 to a denitrification chamber 62, where the nitrates of the recycle stream are reduced to nitrogen gas by the organic matter in the raw sewage. The effluent of the denitrification chamber passes through means 64 to the complete-mix aeration chamber 66 for sufficient mixing and aeration to reduce the B.O.D. level of the mixed liquor to less than 75 ppm. The effluent of chamber 66 passes through conduit 68 to plug-flow aeration chamber 70 where it is aerated to remove another portion of the B.O.D. The effluent of aeration chamber 70 exits through means 72 into sludge-scalper chamber 74 where removal of the more settleable fraction of the activated sludge from the mixed liquor occurs. The effluent of the sludge-scalper chamber 74 is introduced into plug flow aeration chamber 78 by conduit means 76 for further aeration to achieve the effluent B.O.D. level specified by the designing engineer. The effluent of chamber 78 travels through passageway 80 into final clarifier 82, and the final clarified effluent is discharged by means 84 into the sewage treatment plant's outfall. Activated sludge is discharged from the final clarifier 82 through dischargae means 86 to blend with the incoming raw sewage at inlet means 60. Part of the activated sludge from the scalper 74 also joins the incoming raw sewage at inlet means 60 while part of the activated sludge from the scalper 74 is removed by sludge disposal means 88, to maintain the proper concentration of activated sludge in the aeration chambers.

If the reduction of nitrates and phosphates in the treatment plant effluent is unimportant, the denitrification chamber 62 of FIG. 4 may be replaced with a primary clarifier, with appropriate modifications in the handling of the activated sludge streams from the scalper 74 and the clarifier 82. This will give some reduction in the cost of constructing and operating the sewage treatment plant.

FIGS. 3 and 4 show only two of many possible engineering variations of an aeration basin incorporating a sludge scalper. The essential features of the sludge scalper are partial removal of sludge from the mixed liquor by the sludge scalper, and continued aeration of the effluent with the remaining activated sludge in a plug-flow aeration chamber, prior to final clarification.

It is to be understood that while certain forms of this invention have been illustrated and described, it is not limited thereto, except insofar as such limitations are included in the following claims.

Having thus described the invention, what is claimed as new and desired to be secured by Letters Patent is:

1. In an activated-sludge sewage treatment plant, an aeration chamber comprising a series of tanks having common side walls, said chamber comprising:
   inlet means for introducing raw sewage and recycle biological sludge into said chamber;
   a primary aeration means for receiving said sewage influent and treating the same by aeration, to provide an effluent, said means comprising a means for providing complete-mix aeration,
   a settling basin comprising a sludge scalper means for receiving said effluent and having means for removing from 10% to 70% of the settleable biological sludge therefrom to provide a partially clarified effluent;
   a secondary hydraulic plug-flow means for receiving said partially clarified effluent and having means for aerating the same by introduction of air thereto as said effluent flows through said secondary section to progressively reduce the biological oxygen demand and thereby provide a further treated effluent having a B.O.D. of less than 20 ppm;
   a final clarifier means for receiving said further treated effluent and having means for producing a final, clarified effluent; and
   outlet means for discharging said final, clarified effluent from said final clarifier means.

2. The aeration chamber as claimed in claim 1, wherein said primary aeration means comprises said means for providing complete-mix aeration in serial combination with a means for providing hydraulic plug-flow aeration.

3. The aeration chamber as claimed in claim 1, wherein said scalper means comprises a siphoning mechanism for transplanting said biological sludge over the side of said settling basin.

4. The aeration chamber as claimed in claim 1, wherein said effluent introduced into said settling basin has a B.O.D. of from 10 ppm to 40 ppm.

5. The aeration chamber as claimed in claim 1, wherein said effluent introduced into said settling basin has a dissolved oxygen content of from 0.2 ppm to 2.5 ppm.

6. The aeration chamber as claimed in claim 1, wherein said sludge scalper means comprises a scraper used in conjunction with a sump discharge apparatus.

7. The aeration chamber as claimed in claim 6, wherein said sludge scalper means further includes a skimming mechanism for removing oily and fatty wastes from said chamber.

8. In an activated-sludge sewage treatment plant, an aeration chamber comprising a series of separate and distinct tanks not having common walls that are disposed in a space enclosed by a barrier wall, said chamber comprising:
   inlet means for introducing raw sewage and recycle biological sludge into said chamber;
   a primary aeration means for receiving said sewage influent and treating the same by aeration, to provide an effluent, said means comprising a means for providing complete-mix aeration;
   a settling basin comprising a sludge scalper means for receiving said effluent and having means for removing from 10% to 70% of the settleable biological sludge therefrom to provide a partially clarified effluent;
   a secondary hydraulic plug-flow means for receiving said partially clarified effluent and having means for aerating the same by introduction of air thereto as said effluent flows through said secondary section to progressively reduce the biological oxygen demand and thereby provide a further treated effluent having a B.O.D. of less than 20 ppm;
   a final clarifier means for receiving said further treated effluent and having means for producing a final, clarified effluent; and
   outlet means for discharging said final, clarified effluent from said final clarifier means.

* * * * *

UNITED STATES PATENT AND TRADEMARK OFFICE
CERTIFICATE OF CORRECTION

PATENT NO. : 4,915,829

DATED : April 10, 1990

INVENTOR(S) : Sam Long

It is certified that error appears in the above—identified patent and that said Letters Patent is hereby corrected as shown below:

Claim 3, line 25, delete "transplanting" and substitute --transporting-- therefor.

Signed and Sealed this

Thirteenth Day of August, 1991

Attest:

HARRY F. MANBECK, JR.

*Attesting Officer*     *Commissioner of Patents and Trademarks*